(12) United States Patent
Monse et al.

(10) Patent No.: US 7,013,328 B2
(45) Date of Patent: Mar. 14, 2006

(54) ELECTRICAL DRIVE SYSTEM WITH DRIVE UNIT NETWORKS, INTERCOMMUNICATION NETWORKS AND MULTI-LINK-CONTROLLER

(75) Inventors: Mathias Monse, Nürnberg (DE); Harold Meis, Burgthann/Mimberg (DE); Harald Mainka, Erlangen (DE)

(73) Assignee: Baumuller Anlagen-Systemtechnik GmbH & Co., Nurnberg (DE)

( * ) Notice: Subject to any disclaimer, the term of this patent is extended or adjusted under 35 U.S.C. 154(b) by 583 days.

(21) Appl. No.: 09/995,147

(22) Filed: Nov. 27, 2001

(65) Prior Publication Data

US 2003/0100961 A1 May 29, 2003

(51) Int. Cl.
*G06F 13/00* (2006.01)

(52) U.S. Cl. .................. 709/208; 709/223; 709/248; 709/249

(58) Field of Classification Search ............... 709/201, 709/203, 208, 209, 218, 223, 226, 238, 250, 709/248, 249
See application file for complete search history.

(56) References Cited

U.S. PATENT DOCUMENTS

| | | | | |
|---|---|---|---|---|
| 5,988,846 A * | 11/1999 | Flamm et al. | ............... | 700/8 |
| 6,097,499 A * | 8/2000 | Casey et al. | ............... | 358/1.16 |
| 6,363,231 B1 * | 3/2002 | Manzer et al. | ............... | 399/82 |
| 6,483,812 B1 * | 11/2002 | Prorock | ............... | 370/252 |
| 6,526,044 B1 * | 2/2003 | Cookmeyer et al. | ........ | 370/352 |
| 6,707,563 B1 * | 3/2004 | Barry et al. | ............... | 358/1.14 |
| 6,771,386 B1 * | 8/2004 | Kato | ............... | 358/1.15 |
| 2002/0015177 A1 * | 2/2002 | Yamakado et al. | ........ | 358/1.15 |
| 2002/0171850 A1 * | 11/2002 | Agne | ............... | 358/1.1 |

* cited by examiner

*Primary Examiner*—Viet D. Vu
(74) *Attorney, Agent, or Firm*—Frank H. Foster; Kremblas, Foster, Phillips & Pollick (57) ABSTRACT

An electrical drive system for the synchronized adjustment of rotatable axles or linearly movable functional parts in particular for printing machines, in terms of their position, speed or acceleration. Drive units are controlled using computer assistance and are connected to one or more functional parts for their adjustment. A plurality of drive networks, which each have a plurality of the drive units as network nodes, are allocated to some or a group of the functional parts. Inside at least one of the drive networks, its nodes or drive units are arranged in accordance with the master/slave principle and are respectively connected to one another in a ring structure through communication channels and/or a communication system. At least one node of a drive network is coupled in a ring structure with one node of another drive network, likewise in accordance with the master/slave principle, through inter-communication channels and/or an inter-communication system or network.

8 Claims, 8 Drawing Sheets

SDC - SyncDrive Controller

DSP - digital signal processor
DRV_COM_MGR - module to manage the data flow from and to drive network
VSA_MGR - module to manage the virtual synchronisation axis function
DTA_DIST_MGR - module to manage the data flow between the networks
SI_PLC - serial interface to process control network
SI_ISR - serial interface to inter SDC network
SI_DRV - serial interface to drive network
COM_MANAGER - modules to manage the communication over that interface
TX - transmit interface at communication interface
RX - receive interface at communication interface

ELECTRICAL DRIVE SYSTEM WITH DRIVE UNIT NETWORKS, INTERCOMMUNICATION NETWORKS AND MULTI-LINK-CONTROLLER

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The invention relates to an electrical drive system for the synchronised adjustment of a plurality of rotatable axles or further, also linearly movable functional parts of devices and machines, in particular printing machines, in terms of their position, speed or acceleration. A plurality of drive units controlled using computer assistance are connected, according to the single drive technique which is known per se, to one or more functional parts for their adjustment.

2. Description of the Related Art

In this context, it is known (Patent DE 196 33 745 C2) to form a plurality of separate drive networks, which respectively have a plurality of the said drive units as network nodes. The communication of these drive units with one another is carried out via a parallel bus system. Since, for example in the case when newspaper printing machines are being used, from 100 to 200 drives to be synchronised are by no means uncommon, this known patent proposes that a plurality of such drive networks be formed separately from one another and, according to a section of the machine or system, these individual drive networks be interlinked with one another via a cross- or intercommunication network and that they be synchronised, above all with one another, on a common master axis. For the intercommunication network, a ring topology is proposed with the communication taking place in accordance with the master/slave principle (cf. SERCOS interface, known per se). In this case, the bus masters of the respective drive networks form slave nodes of the intercommunication network, and a further bus master also functions as the bus master of the intercommunication network. In order that further machine sections can be synchronised with the aforementioned machine section, the patent also proposes that the bus master of a first intercommunication network specify a synchronous clock via its master synchronisation telegrams, not only for the slaves of its network but also, via a communication interface inserted as an additional network node, for the neighbouring master/slave intercommunication network. The communication interface is in this case simultaneously a node of the neighbouring network. It is therefore possible for setpoint values, generated at a master level, to be distributed to a multiplicity of drives running in angular synchronism. Stringent requirements in terms of synchronisation can hence be satisfied. Even time shifts of the setpoint values by one µs lead at a high production rate (for example 35,000 print copies per hour) to an angular error of 3.5 millidegrees. On a printed paper, this can cause an offset between two colours of 0.01 mm (if the printing roll has a circumference of approximately 1100 mm) with corresponding disadvantages for the printing quality. However, the use of a parallel bus structure according to the patent in the respective drive networks leads to a high outlay on transmission and cabling. This disadvantage is exacerbated further when significantly large distances need to be covered.

To help, the drive system specified in Patent claim 1 is proposed, which is distinguished from the said previously published patent by the fact that the drive units or nodes of the drive network are arranged in accordance with the master/slave principle and are respectively connected to one another in a ring structure through communication channels and/or a communication system. With the master/slave ring structure, the individual nodes or drive units can advantageously be set for synchronisation to a common clock, with minimal outlay on cabling and installation. Furthermore, it is possible to cover larger distances than with the previously known use of the bus topology.

In relation to the drive system disclosed in the aforementioned patent, there is furthermore the requirement for increased reliability, availability and maintainability. In multi-axis applications, for example in printing machines, it is necessary to ensure that the failure of individual drive units, drive networks or of the intercommunication network interlinking them does not lead to failure of the entire machine system or of the entire drive system. Besides this, also to increase availability and maintainability, there is the further requirement that both logical and physical drive groups or networks can be formed with high flexibility. Therefore—to increase availability—it should be possible to switch off individual machine parts or machine systems without affecting the rest of the machine.

It is also an aim of the invention that, beyond the actual hardware network configuration, in principle any drives can be combined into logical groups or networks, to which different setpoint values are then applied. In the case of using printing machines in which each folding mechanism usually specifies a master axis, it should be possible to synchronise each printing mechanism with any folding mechanism for the definition of a paper web.

A further requirement is to supply drive groups with additional setpoint values which are independent of a centrally specified master axis and which are processed, while being synchronised with one another, in the drives allocated to this master axis. In the case in which printing machines are used, this function is typically needed for adjustment of the cutting register.

Furthermore, for so-called set-up operation and various synchronising functions, there is the requirement for group formation which takes place independently of the respective master axis allocation.

A further requirement is to increase the diagnosability as well as the modularity of the electrical drive system.

In order to meet these requirements, in the scope of the general inventive concept, the electrical drive system specified in Patent claim 2 is proposed, which is distinguished by a plurality of intercommunication networks coupled with one another for the purpose of data and/or command interchange. Their nodes, which are communicatively coupled with one another, simultaneously belong to different drive networks. A multi-link controller is furthermore arranged, which has communication components or interfaces that each form the respective nodes of one of the intercommunication networks. This makes it possible for the individual intercommunication networks to be connected modularly and flexibly, interlinked logically, coupled or managed, which is carried out via a corresponding design, using program and/or circuit technology, of the multi-link controller.

Owing to this drive system according to the invention, the failure of an intercommunication network or of an allocated machine or system section does not cause the rest of the communication, which is taking place via the multi-link controller, to come to a standstill. The failed network and/or the failed machine section, after repair and with restarting, can again join in the data and command interchange in the multi-link controller. On the other hand, if the multi-link controller fails, each machine section or the associated intercommunication network can continue to run independently until, for example, defective cards or modules have been replaced. Owing to the structure according to the invention, it is possible at any time during continuous operation for intercommunication networks with associated machine sections to be isolated from the communication chain for maintenance work, which increases the maintainability.

BRIEF SUMMARY OF THE INVENTION

According to the invention, the multi-link controller conducts comprehensive communication between the individual intercommunication networks. To that end, for each intercommunication network, it provides a network node which simultaneously forms a structural component of the multi-link controller. In this context, it is expedient for the functions of a communication manager to be implemented in the communication component of the multi-link controller. Preferably, the communication component is relieved from undertaking direct drive functions.

The basic function of the multi-link controller according to the invention consists in setting up information interchange of its communication components with the associated intercommunication networks. Such interchange will be incorporated into a data and command transfer encompassing the respective network topology only if it takes place synchronously with a clock of the multi-link controller (expediently embodied in the scope of a processor system integrated in it) and all nodes of the intercommunication network are uniquely identifiable via the communication master (preferably the communication component of the multi-link controller).

The scope of the general inventive concept furthermore includes a multi-link controller, preferably designed as an independent structural unit, which is suitable for incorporation into the drive system according to the invention, owing to the fact that it has plurality of communication components or communication interfaces respectively configured as communication masters for external networks. The multi-link controller is furthermore provided with its own processor for controlling and regulating the communication interfaces.

The scope of the general inventive concept furthermore includes a drive synchronisation control unit which is designed, or is suitable, as nodes of an intercommunication network of the electrical drive system according to the invention. The drive synchronisation control unit according to the invention is essentially distinguished by at least one first communication interface and at least one processor, which controls it and is provided with the following modules:

a master axis module, which is designed to receive, to generate and/or to route data and/or commands for a virtual master axis via the at least one communication interface;

a data distribution module, which is designed for controlling a data and/or command flow via the least one communication interface with one of the aforementioned networks, in particular the intercommunication network.

In a drive network, the synchronisation control unit forms a node basically without any independent drive function. However, it is designed to specify, via its master axis module, master axis data and commands for the drive units or controllers. For the synchronisation control unit, at least two functions are essential: 1) management of the data distribution for organising the communication between the control and the individual drive units (vertical communication) and organising the communication between the individual drive networks via the intercommunication network (horizontal communication) 2) master axis management, mutually synchronised setpoint values for the controlled drive units being made available to form a drive group, so that the drive units are then synchronised with one another according to the virtual master axis.

According to an advantageous refinement of the invention, the further function of drive management is also implemented in the synchronisation control element, so that the individual drive units of the connected drive network are provided with setpoint values and control information and are controlled. According to a further expedient refinement, the synchronisation control unit is combined with a drive controller to form one structural unit, but forms a logically independent component from the direct drive regulation and control (operation of the electric motor in addition to mechanisms coupled to it).

BRIEF DESCRIPTION OF THE SEVERAL VIEWS OF THE DRAWINGS

Further details, features, advantages and effects based on the invention can be found in the following description of preferred embodiments of the invention and the drawings. In the latter, respectively in a schematic structural representation.

DETAILED DESCRIPTION OF THE INVENTION

Figure 1:
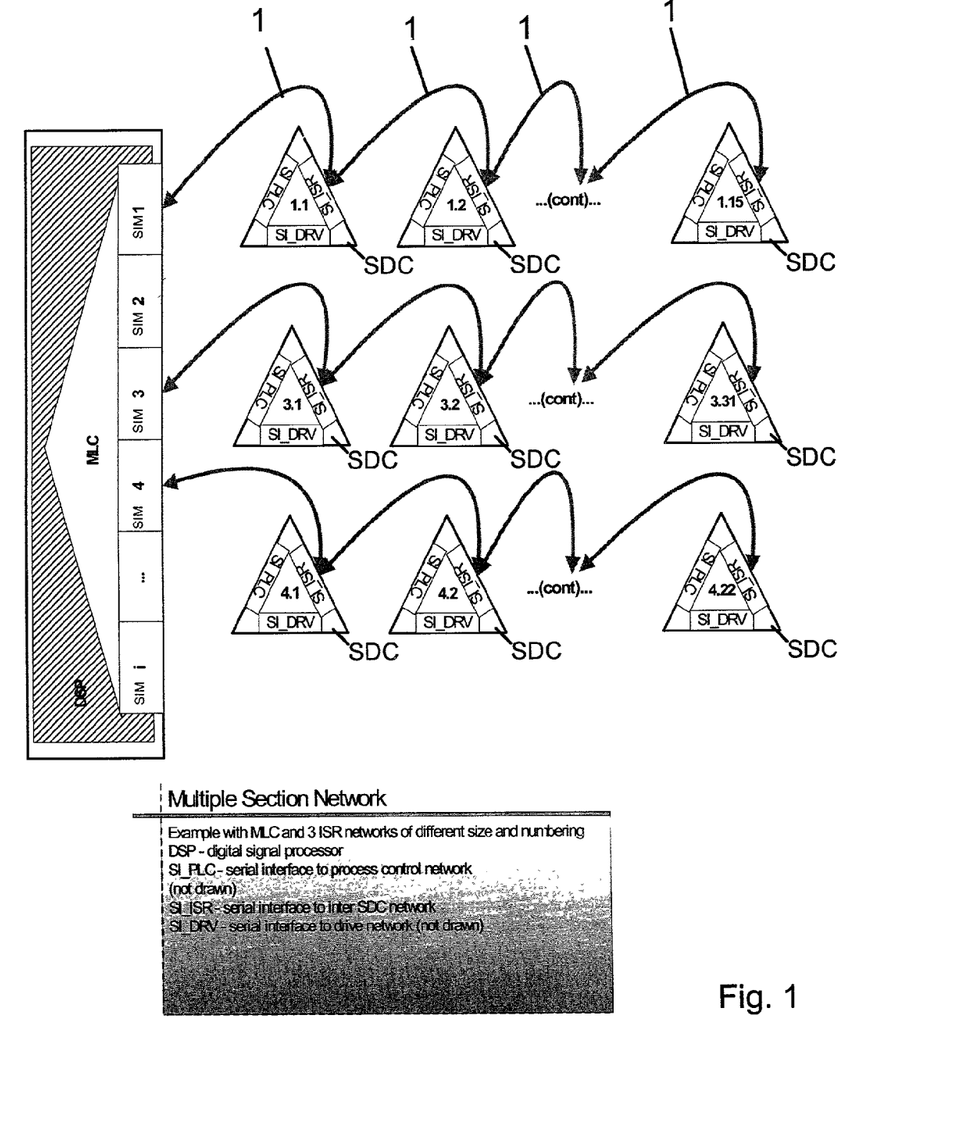
FIG. 1 shows a plurality of intercommunication networks interlinked via a multi-link controller.

FIG. 1 shows an example with a multi-link controller MLC and three intercommunication networks 1.1, 1.2, ... 1.15, 3.1, 3.2, ... 3.31, 4.1, 4.2, ... 4.22 connected to it. The respective connection is carried out via the first, third and fourth communication interfaces SIM1, SIM3, SIM4 of the multi-link controller MLC. These respectively form master nodes for the network communication and are connected via preferably bidirectional communication channels 1 to a respective first drive synchronisation control unit SDC 1.1, SDC 3.1, SDC 4.1 of the intercommunication networks. Further communication channels 1 then lead to further, roughly similarly embodied nodes or synchronisation control units SDC of the respective intercommunication network. These units respectively have an interface SI_ISR specifically designed for the internal network communication, but also respectively two further interfaces SI_PLC and SI_DRV for communication with further networks (not shown), for example a superordinate process control network PLC and a subordinate drive network (cf. FIG. 4). Each of the three intercommunication networks shown is used for multi-drive or multiple adjustment of an individually allocated machine of a multi-machine system or of an individually allocated machine section.

Figure 2:
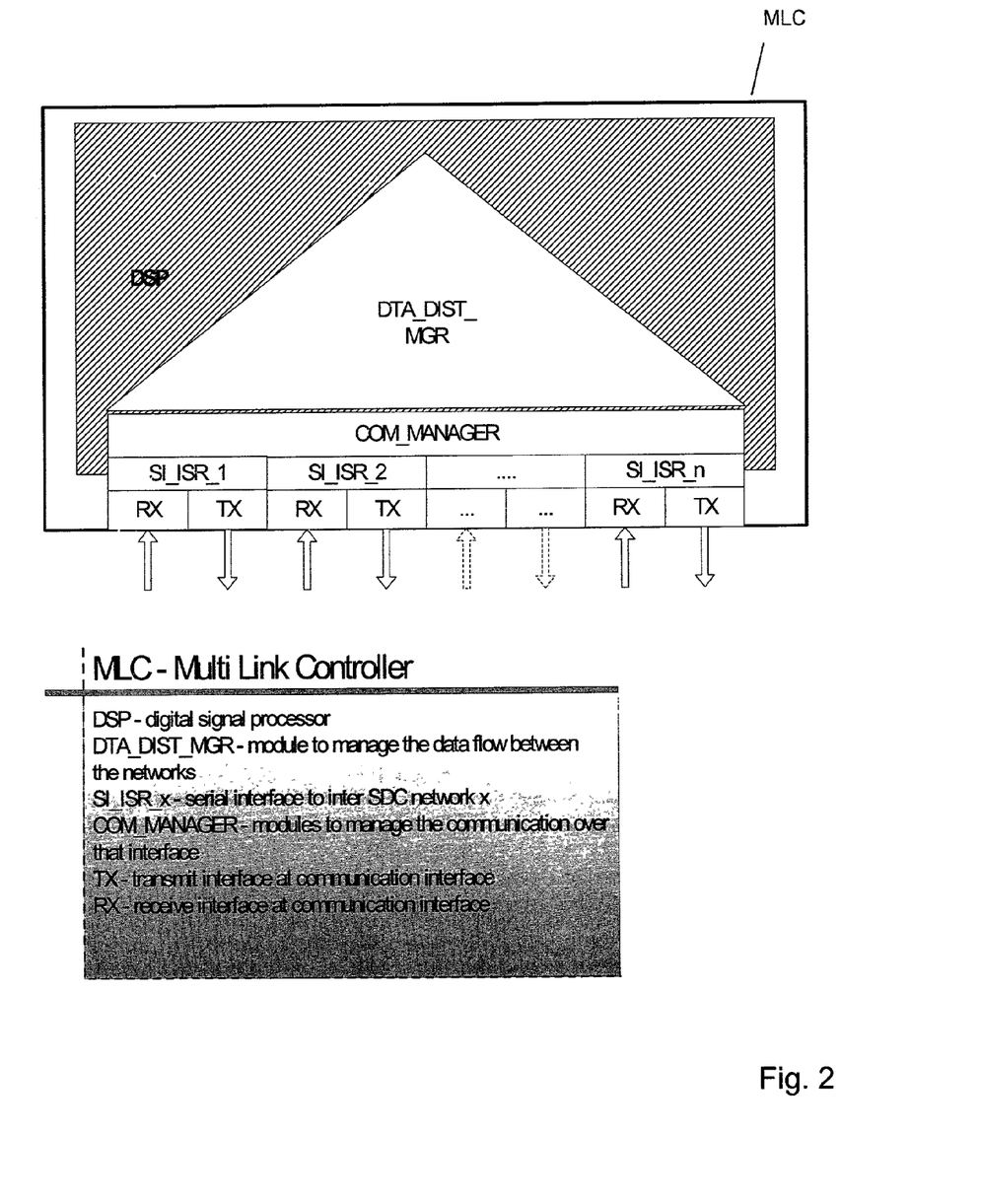
FIG. 2 shows the internal structure of the multi-link controller.

According to FIG. 2, the multi-link controller MLC may be embodied in hardware form, for example with a single digital signal processor and a multiplicity of preferably serially operating interfaces SI_ISR_1, SI_ISR_2, ... SI_ISR_N, which respectively participate via a transmission component TX and a reception component RX as nodes for a respective intercommunication network (cf. FIG. 1) in its information traffic. For control and coordination, use is made of a communication management software module COM_Manager which can be run on the signal processor DSP and, for example, is also designed to check transmitted data. The signal processor DSP is furthermore configured, above all using program technology, to run a data distribution software module DTA_DIST_MGR. With the aid of this software module, the multi-link controller MLC can conduct the communication between the individual intercommunication networks. Individual data and/or command streams from one intercommunication network can hence flow via the multi-link controller, or its data distribution module, to another intercommunication network. In addition, filtering or other processing of data which is received and is to be routed can take place by means of the digital signal processor DSP. The filtering result with respect to data of a first intercommunication network is then conveyed by means of the multi-link controller to a second cross-communication network, the respectively allocated communication interfaces SI_ISR$_x$ being switched on. For instance, it is possible to allocate a master axis function from a first intercommunication network to any drive units DRC (see FIGS. 4 and 5) of other intercommunication networks.

Figure 3:
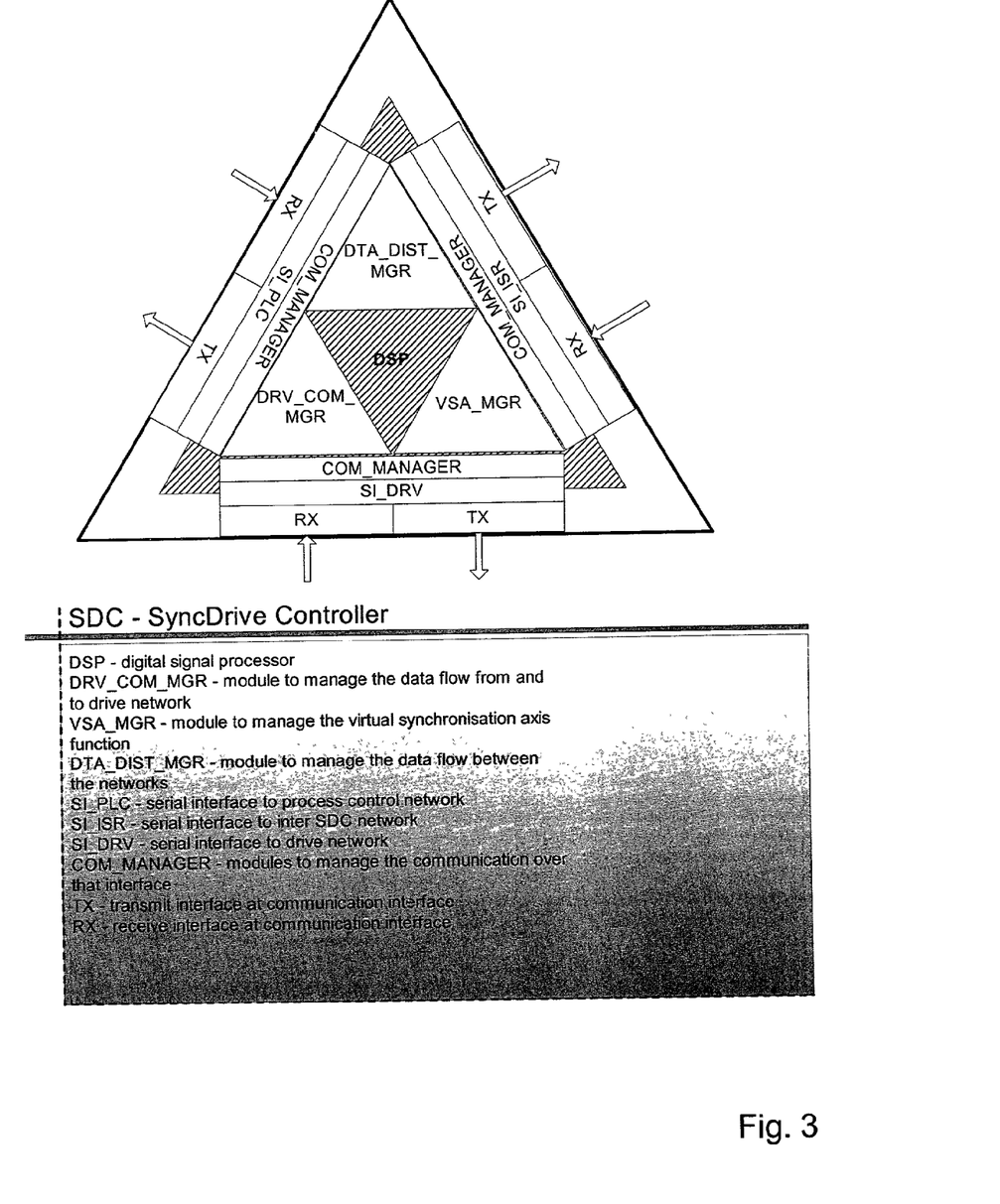
FIG. 3 shows the internal structure of a drive synchronisation unit.

According to FIG. 3, the drive synchronisation control unit also has, as its hardware core, a digital signal processor DSP. Implemented, or programmed, so as to be run via the latter are the following software modules:
 drive communication module DRV_COM_MGR, for organising a data flow from and to the respectively connected drive network (cf. e.g. FIG. 4)
 master axis module VSA_MGR, for receiving, temporarily storing, generating and/or routing commands and data for synchronising the drive units of the connected drive network according to a virtual master axis
 data distribution module DTA_DIST_MGR, for organising an command and/or data flow from and to connected networks via, in the example shown, three communication interfaces.

According to the exemplary embodiments which are shown, the communication interfaces SI_PLC, SI_ISR, SI_DRV for serial data transmission are respectively configured via transmission and reception components TX and RX and are respectively intended, via communication channels 1, for connection to a superordinate process control network, to the intercommunication network belonging to the respective synchronisation control unit and to the respectively allocated intercommunication network. Whereas these communication interfaces are still substantially embodied with their own hardware elements, respective communication management modules COM_MANAGER are designed to be run on the signal processor DSP to operate them (as for the multi-link controller according to FIG. 2).

Figure 4:
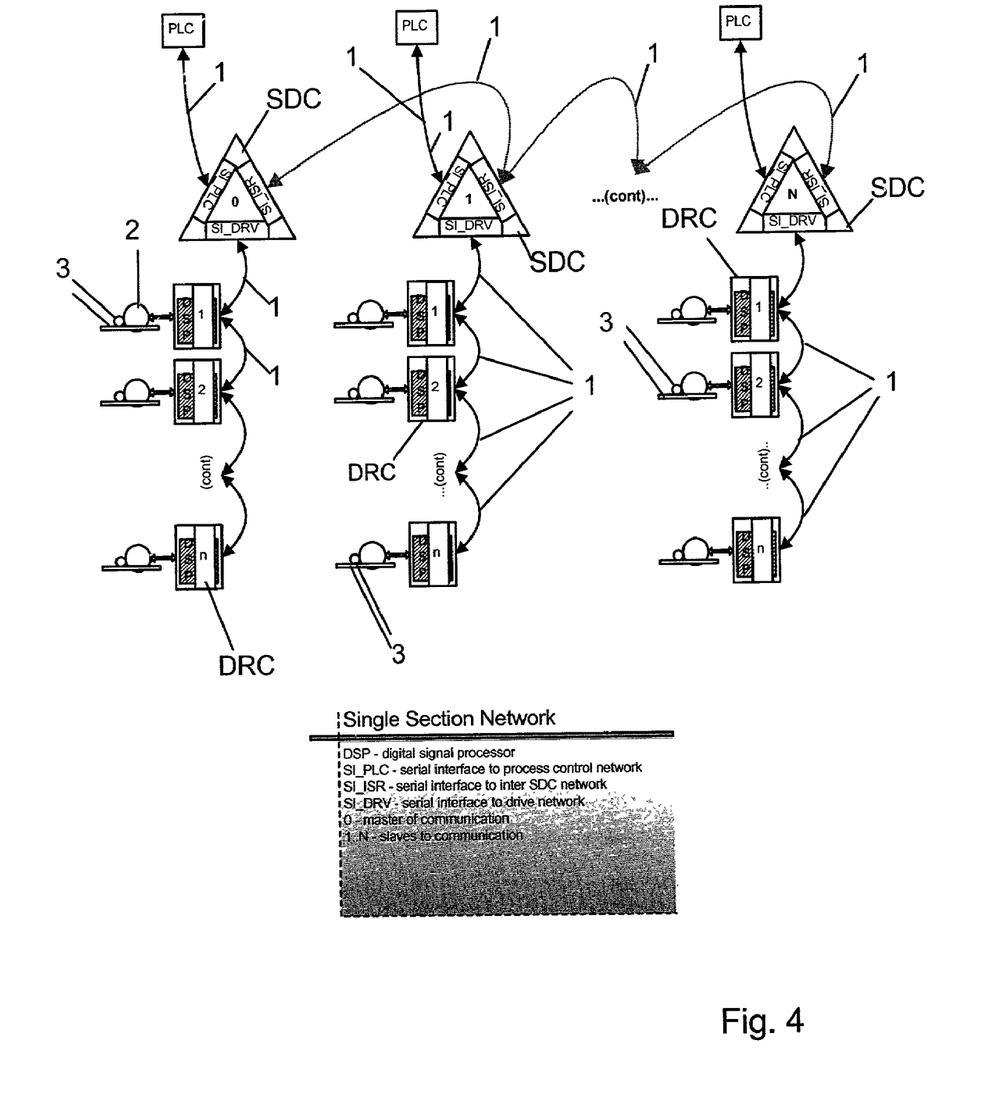
FIG. 4 shows an intercommunication network with a plurality of connected drive networks.

FIG. 4 shows the multi-network structure. The individual synchronisation control units SDC are connected to one another via their first communication interface SI_ISR, which is respectively intended for this, as nodes of an intercommunication network by means of preferably bidirectional communication channels 1 or a further communication system. Via the second communication interface SI_DRV, the synchronisation control units SDC respectively form a node of an allocated drive network with drive units DRC controlled using computer assistance. To form the drive networks, or to connect their nodes, communication channels 1 or a further communication system are likewise provided. To each electrical drive unit DRC, which, in particular, comprises an electric motor 2, are allocated one or more mechanically movable functional parts 3 for their adjustment with respect to position, speed or acceleration. The nodes of the individual drive networks SDC0, DRC1, DRC2, DRCn; SDC1, DRC1, DRC2, ..., DRCn; ... and of the intercommunication network SDC0, SDC1, ..., SDCN expediently access the communication channels 1, which are interlinked with one another, or the communication system or the further communication media in accordance with the master/slave method which is known per se. The data transfer expediently takes place synchronously in the two networks. In this case, in the drive networks, the synchronisation control units SDC0, 1, ..., N from the intercommunication networks respectively form the communication master with independent transmission right. Inside the communication network, a first synchronisation control unit SDC0 forms the communication master with respect to the others SDC1, SDC2, ..., SDCN.

According to FIG. 4, the individual nodes or synchronisation control units SDC of the intercommunication network can interchange commands and data with a master control level, or a process control network PLC, via respective third communication interfaces SI_PLC. In particular, owing to large amounts of data to be transmitted, the data transfer takes place asynchronously here.

Figure 5:
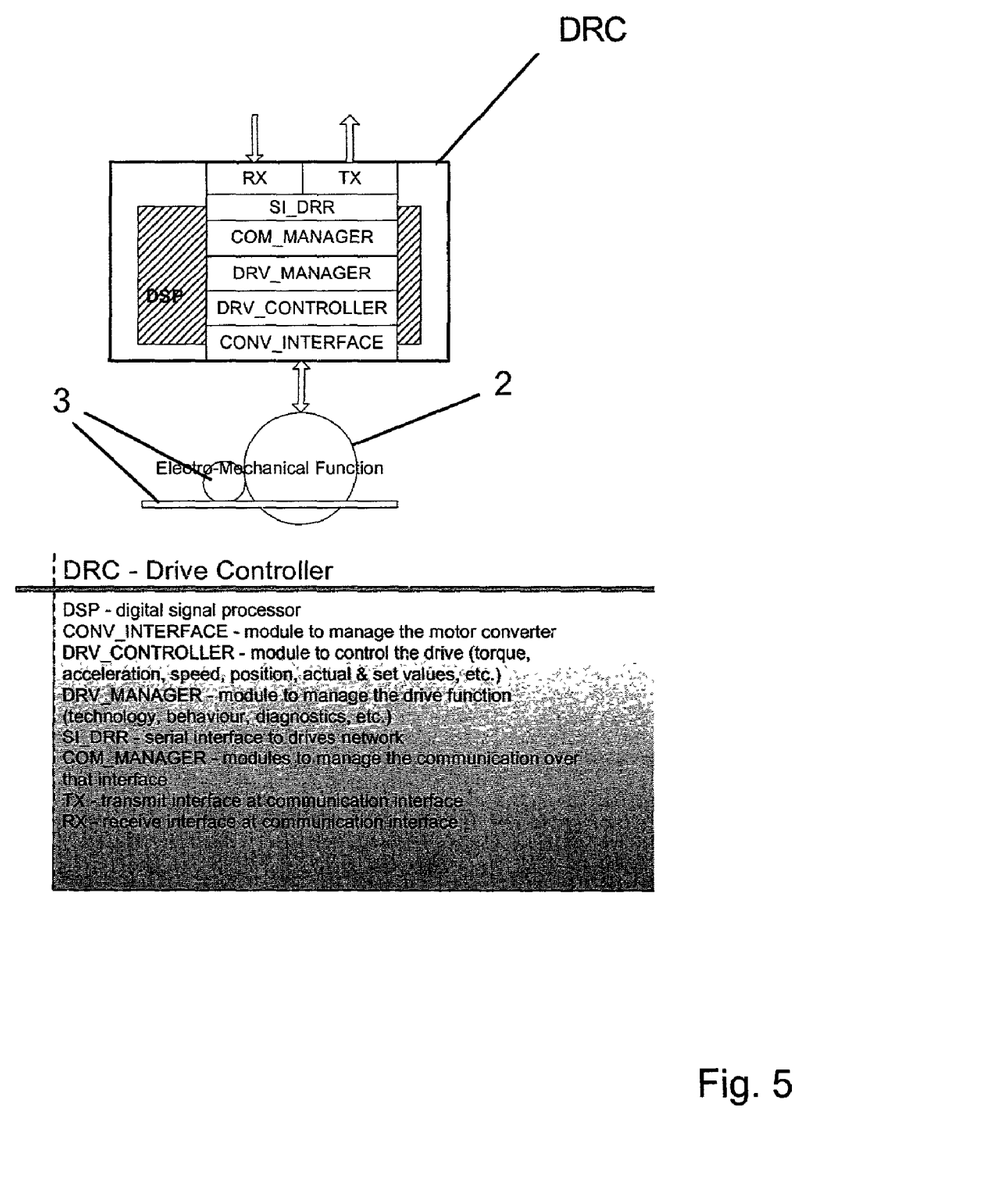
FIG. 5 shows the internal structure of a drive unit.

According to FIG. 5, the drive unit DRC has, as basic hardware elements, a communication interface SI_DRR with transmission and reception components TX. RX, a converter interface CONV_INTERFACE and a digital signal processor DSP tat regulates and controls the latter. Runnable thereon, the drive unit DRC also comprises the following software modules:
 converter interface module for controlling the converter for the electric motor 2 drive controller DRV_CONTROLLER for generating and processing setpoint and actual values with respect to torque or acceleration, (angular) speed, position etc.

drive manager DRV_MANAGER for organising superordinate and, optionally, customer-specific drive functions, including monitoring, diagnosis and error-handling functions communication management module COM_MANAGER for operating the preferably serial synchronous communication interface SI_DRR (similar to FIGS. 2 and 3).

Figure 6:
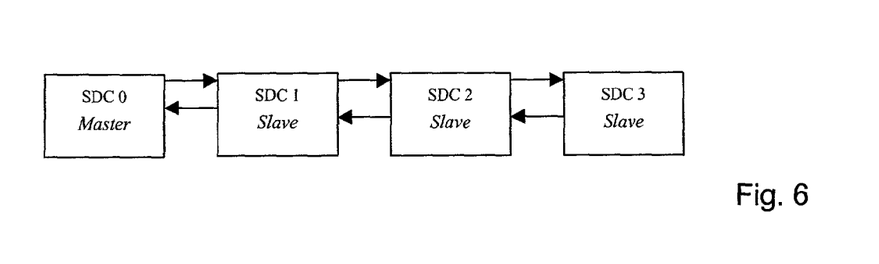
FIG. 6 shows an intercommunication network in ring topology.

According to FIG. 6, in an alternative of the invention, the electrical drive system is embodied with a single intercommunication network in a serial ring structure, preferably with synchronous data transmission, the individual network nodes being implemented with synchronisation control units SDC0, SDC1, SDC2, SDC3, . . . . Each of these has a master axis function and can operate, as a communication master, a synchronously communicating drive network (cf. FIG. 4), preferably in a ring structure. The first synchronisation control unit SDC0 functions, in the scope of the master/slave method, as a communication master with respect to the other network nodes SDC1, SDC2, SDC3, . . . . To simplify the representation, drive networks that can be connected to each node of the communication network are not shown.

Figure 7:
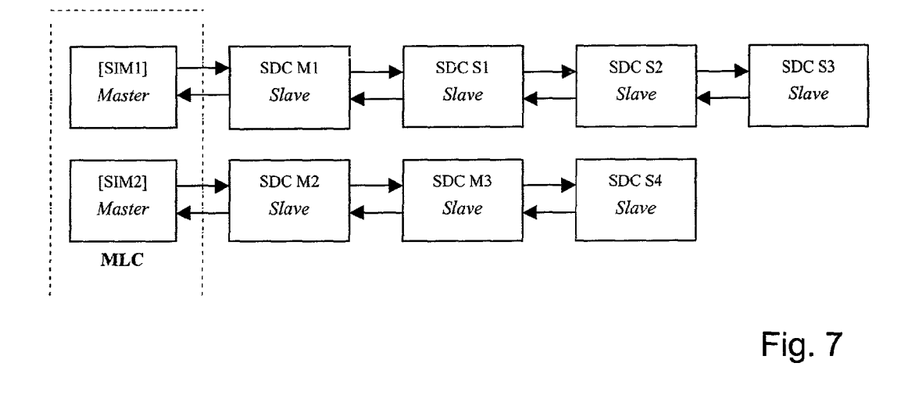
FIG. 7 shows a plurality of annular intercommunication networks interlinked via a common multi-link controller.

According to FIG. 7, in order to achieve a modular communication structure, a plurality of intercommunication networks are arranged running parallel respectively in a ring structure with master/slave hierarchy. The multi-link controller MLC in each case provides a master node SIM1, SIM2, which comprise the aforementioned communication interfaces, for the two represented intercommunication networks SDC M1, SDC S1, SDC S2, SDC S3 (first intercommunication network) and SDC M2, SDC M3, SDC S4 (second intercommunication network). The communication masters SIM1, SIM2 from the multi-link controller MLC (in practice, embodied by means of a SERCOS interface card) are not provided with direct drive functions. Conversely, all further nodes or drive synchronisation control units can in principle operate and guide a preferably annular drive network, i.e. they can function as communication masters or master nodes for it. Via corresponding data and command interchange with the multi-link controller MLC, particular synchronisation control units SDC can be defined either as masters with a master axis function (Mx: SDC master) or as slaves without a master axis function (Sx: MDS slave).

A maximum number of synchronisation control units SDC is then obtained, as a function of the number of intercommunication networks, from the following conditions:

The maximum number of synchronisation control units SDC, i.e. the sum of masters and slaves; per intercommunication network is equal to 32

The maximum number of SDC masters in the entire system is equal to 31.

Example: if six intercommunication networks of a system were each equipped with five SDC masters, up to 27 SDC slaves could also be inserted per intercommunication network.

The failure safety of the entire system is improved by the fact that, if one of the intercommunication networks fails, the remaining communication via the multi-link controller remains unaffected by this. After restarting, the intercommunication network that failed and has been repaired can again join in the data interchange via the multi-link controller. This advantage is also obtained from the star structure with the multi-link controller MLC as the star centre.

The configuration represented in FIG. 7 also provides the opportunity of sending communication control and/or command signals, which have been generated by a master node SDC Mx of one intercommunication network, via the multi-link controller to the slave nodes SDC Sx of another communication network.

With the multi-network structure represented in FIG. 7, having the multi-link controller MLC as the star centre, an existing machine section, operated with a single intercommunication network, of a mechanised system can be expanded or upgraded by further machine sections with new intercommunication networks, even if the communication networks have different software versions. To that end, the multi-link controller MLC is designed, by using program and/or circuit technology, in such a way that it can convert the communication protocol of an older-version intercommunication network into another communication protocol of a second, newer-version intercommunication network (so-called protocol converter). For the storage of received data according to its protocol, it is expedient to provide the multi-link controller with a reception storage unit (not shown in the drawings) for such data.

The multi-link controller does not need data input and output in relation to an operator from a workstation or from an intercommunication network. It is expedient, however, to provide the multi-link controller with a facility for separate parameterisation and an interface to an external error diagnosis system, for example a superordinate process master control PLC (not shown).

Figure 8:
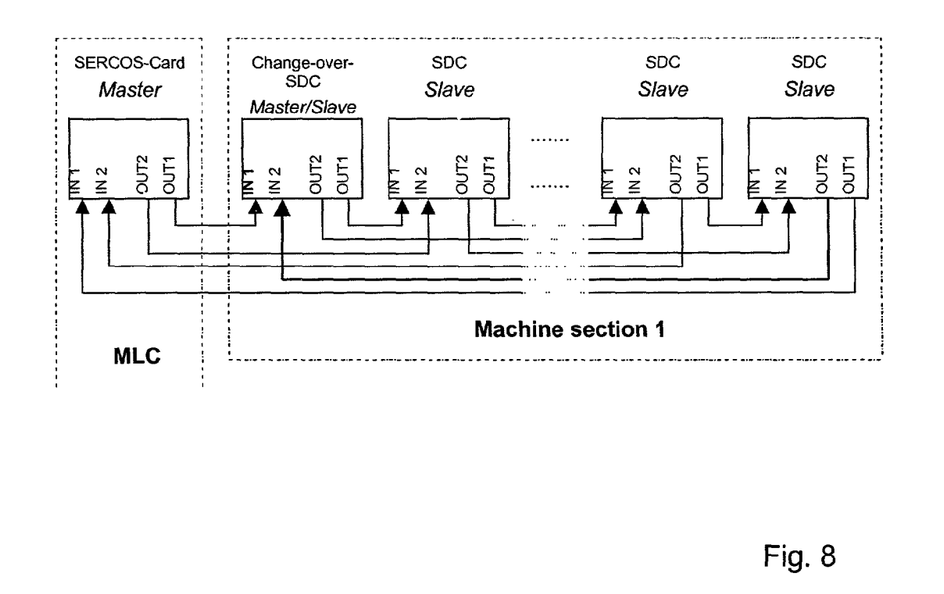
FIG. 8 shows a redundantly configured example of an annular intercommunication network.

In FIG. 8, to increase availability, the star structure according to the invention with the multi-link controller MLC is redundantly designed. On the basis of the jumper cabling, two participants or nodes in a communication ring can in principle fail without this leading to failure of the entire ring. The redundant structure can be produced both for drive networks in ring form and for intercommunication networks in ring form. By using the multi-link controller MLC, it is also not a problem for individual intercommunication networks corresponding to individual machine sections to be removed from the group for maintenance purposes and later reactivated via the multi-link controller MLC. The drive structure according to the invention hence not only serves for clarity, but also contributes crucially to high availability of the printing machine system, which is required above all in newspaper printing machines.

According to FIG. 8, the possibility of the following operating nodes is obtained for each machine section:

Intercommunication operation: the multi-link controller MLC is activated and the respective machine sections are switched to it. All drive synchronisation control units SDC are slaves, in the scope of the intercommunication network comprising them, with respect to the master node of the multi-link controller.

Separate operation: the multi-link controller is activated, but at least one machine section and the associated intercommunication network are switched off.

Single operation: the multi-link controller is deactivated, even if the one or more machine sections with associated intercommunication networks are switched on. One of the nodes, or one of the synchronisation control units SEC, of the communication network switches over to the role of the communication master dominating it.

In the this way, on the one hand, redundancy is guaranteed if the multi-link controller MLC fails and, on the other hand, the release of a machine section for maintenance work can also be controlled as viewed from the side of the intercommunication network. According to an advantageous configuration, the switchover of a machine section from the operating mode of "intercommunication operation" to "single operation" is possible in real time. In this way, the communication networks per se can be configured flexibly.

Figure 9:
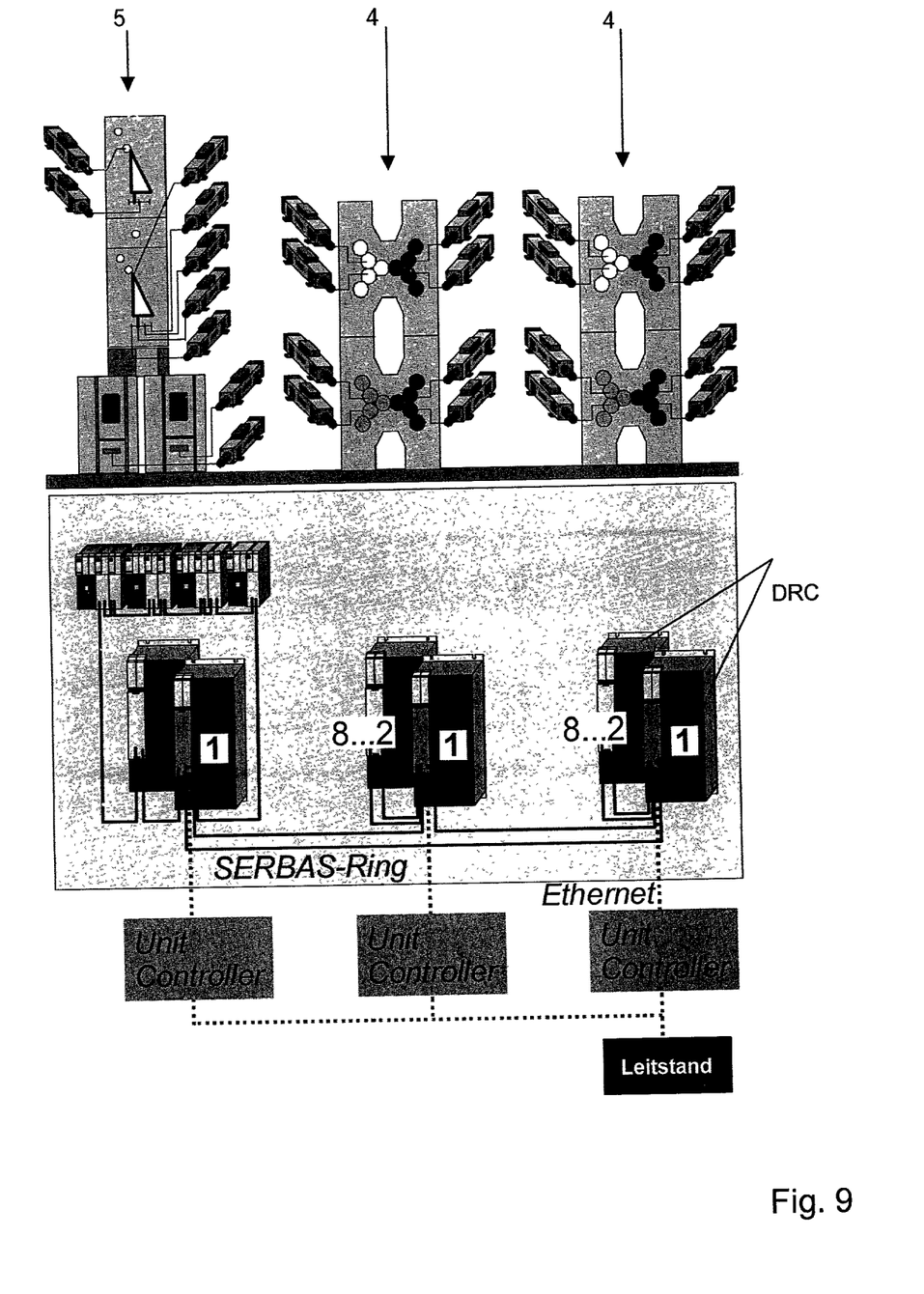
FIG. 9 shows an example of the use of an intercommunication network with a plurality of drive networks in a printing machine system.
Figure 10:
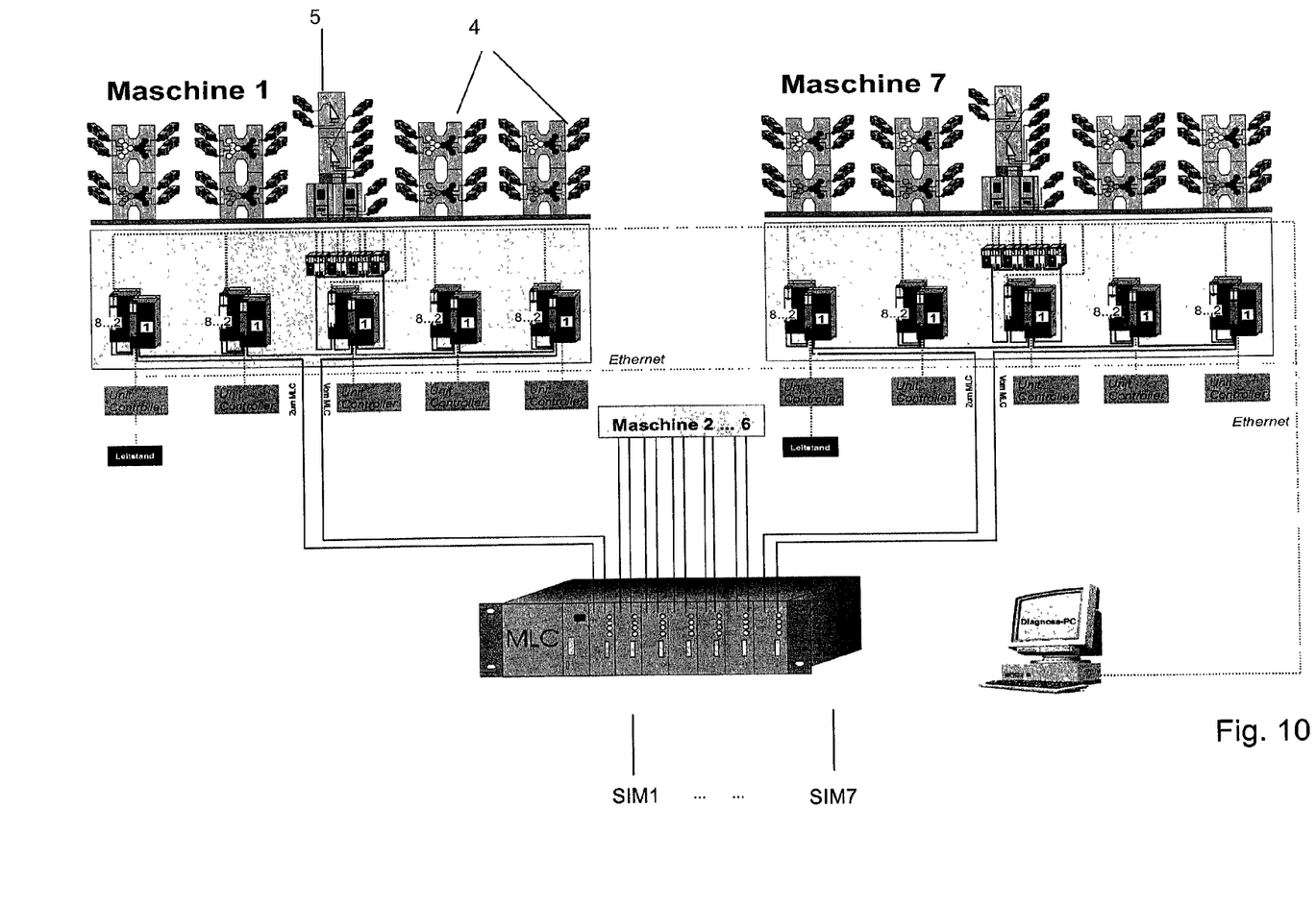
FIG. 10 shows the interlinking of a plurality of intercommunication networks, or allocated printing machine sections, via a multi-link controller.

FIGS. 9 and 10 represent examples of the use of the drive system according to the invention respectively without and with a multi-link controller in a printing machine system having a large number of printing towers 4 and a plurality of folding mechanisms 5, as known to the person skilled in the art.

According to FIG. 9, three annular drive networks are respectively formed with eight drive units DRC for the printing towers 4 and the folding mechanism 5. In this case, the master function or the role of the communication master for the drive rings, each of which communicate synchronously, is in each case allocated to one of the drive units. A drive network corresponds to the drive equipment of a complete printing tower 4. The annular drive networks operate in accordance with the master/slave method with synchronous data transmission (corresponding to the SERCOS interface which is known per se). The drive unit respectively having the master function is coupled via the Ethernet, which is known per se, to a control UNIT and undertakes the task of supplying all drive units 2 . . . 8 allocated to it with the synchronised setpoint values and control signals intended for them. Likewise, the status information from all coupled drive units is combined here and made available to a master level via Ethernet. Besides the operation of its own drive, the drive unit dominating the drive network as a communication master may also undertake a master axis function. The printing tower 4 equipped in this way can hence be regarded as a building block of a complex printing machine section or printing machine. The interlinking of these building blocks (in the example application: printing towers 4) to facilitate intercommunication between the drive masters takes place through a second, synchronously communicating master/slave network—the intercommunication network (SERBAS)—which likewise connects the drive networks or rings physically according to a ring topology corresponding to the SERCOS interface. In practical exemplary embodiments, the intercommunication network SERBAS may consist of up to 32 communication partners or network nodes. This intercommunication makes it possible for drives or drive rings to be allocated to a virtual or even a real master axis. The resulting drive groups correspond, in the application example which is represented, to the path of a paper web through the printing machine system. In general, the role of the master axis will be given to a folding mechanism 5. This means that all drives allocated to this master axis must be synchronised to the absolute position of this master axis, or of the folding mechanism. In a machine or a part/section of it, in practical application examples, it is possible to define up to 32 such master axes, to which any drive units may respectively be allocated. The essential information which needs to be distributed via the intercommunication is the web-specific setpoint speed values as well as the associated control and status information. This gives rise to a new building block, which represents an independent sub-machine or a machine section of a complex system.

According to FIG. 10, the individual sections (in the example which is represented, seven sections 1.7) are interlinked with one another and managed via the multi-link controller MLC. A participant or node SIM 1 . . . 7 which does not undertake any drive function is included in the annular intercommunication network of each section. This intercommunication network node is simultaneously part of the multi-link controller MLC which, according to the actual practical realization status can manage up to seven intercommunication rings or networks. This gives, as the number of drive units to be operated synchronously: 48 (per drive network)×31 (per intercommunication network)×7 (per multi-link controller)=10416. The multi-link controller MLC provides each section, or each associated intercommunication network, with all information needed for allocating each drive unit DRC present in a machine section to one of the 32 possible master axes. This facilitates the construction of drive configurations that are very complex, yet can be structured well. Since the drive structure also reflects the mechanical structure of the machine, complex systems with many drives also gain in clarity and therefore become easier to control and operate.

In addition to the physical network structures, which are frequently based on the actual mechanical layout, it is also possible to form and define independent logical (network) structures. Each drive can hence be allocated to one of, for example, 32 drive groups or networks. The groups formed in this way can be supplied with additional group-specific setpoint values. These group setpoint values may be independent of any master axis, although they likewise need to be implemented in synchronism. In this case, it is possible to define a group master which is independent of the master axis, and to which other group members are synchronised. In the application of printing machines, such functions are used in set-up operation for the intake of paper webs, or also for the synchronisation of a plurality of paper webs.

According to an advantageous refinement, the setpoint values may be specified by the control level (UNIT CONTROLLER) via the Ethernet connection to the nodes of the drive networks functioning as communication masters. Since, with the methods described above, synchronisation of the drives in the system is ensured, the specification of the web-specific setpoint speed values may take place asynchronously via Ethernet interfaces. In this case, the protocols TCP, UDP and IP may also be employed. A central diagnosis PC may be coupled, at least in terms of information technology, with each drive unit via the Ethernet. Besides diagnosis and operation, this provides the opportunity for central management of all relevant parameterisations in the system. Through ISDN or modem connection of the diagnosis PCs, any system worldwide can be reached for teleservice or error diagnosis.

What is claimed is:

1. An electrical drive system for the synchronized adjustment of the position, speed or acceleration of a plurality of movable, functional parts of devices and machines, the system comprising:
(a) a plurality of drive units each connected to one or more of the functional parts for said adjustment under computer assisted control;
(b) a plurality of drive networks, each drive network having a plurality of the drive units as network nodes, each drive network allocated to a group of the functional parts, the nodes of at least one of the drive networks connected together for communication between the nodes;
(c) a plurality of intercommunication networks for synchronizing the drive units of different drive networks, each intercommunication network connecting a node of a drive network with a node of another drive network;
(d) a multi-link controller having a plurality of communication components, each communication component being a node of one of the intercommunication networks for coupling the nodes of the intercommunication network; and (e) drive synchronisation control unit as nodes of an intercommunication network for an electrical drive system having at least one communication interface and at least one processor that controls it and is provided with the following functional modules:
  (i) a master axis module, designed to receive, to generate and/or route data and/or commands for a virtual master axis via the at least one communication interface and
  (ii) a data distribution module, which is designed for controlling a data and/or command flow via the at least one communication interface with one of the networks, in particular the intercommunication network.

2. A drive system according to claim 1 wherein the synchronisation control unit has the processor also provided with a second communication interface and a drive communication module that can be coupled with it and is designed for controlling a data and/or command flow via the second communication interface with one of the drive networks.

3. A drive system according to claim 2 wherein the synchronisation control unit has a master axis module designed for access to the two communication interfaces for the purpose of bidirectional data and/or command interchange between two networks.

4. A drive system according to claim 3 wherein the synchronisation control unit has a processor provided with a third communication interface, with which the drive communication module and/or data distribution module for organising a command and/or data flow between one of the drive and/or intercommunication networks, on the one hand, and a further control network with asynchronous data interchange, on the other hand, can be coupled.

5. A drive system according to claim 4 wherein the synchronisation control unit has a drive communication module designed for access to the second and third communication interfaces for the purpose of bidirectional data and/or command interchange between two networks.

6. A drive system according to claim 4 wherein the synchronisation control unit has a data distribution module designed for access to at least two of the first, second and third communication interfaces for the purpose of bidirectional data and/or command interchange between at least two of the different networks.

7. A drive system according to claim 6 wherein the synchronisation control unit has a processor provided with one or more modules that regulate and/or control the first, second and third communication interfaces, for communication management via these communication interfaces.

8. A drive system according to claim 7 wherein the synchronisation control unit has a data distribution module which comprises filtering or other processing functions for data and commands from at least one communication interface for at least one other communication interface.

* * * * *